US009196040B2

(12) United States Patent
Gantman (10) Patent No.: US 9,196,040 B2
(45) Date of Patent: Nov. 24, 2015

(54) METHOD AND APPARATUS FOR MOVEMENT ESTIMATION

(71) Applicant: QUALCOMM Incorporated, San Diego, CA (US)

(72) Inventor: Alex Gantman, Yokneam (IL)

(73) Assignee: QUALCOMM Incorporated, San Diego, CA (US)

( * ) Notice: Subject to any disclaimer, the term of this patent is extended or adjusted under 35 U.S.C. 154(b) by 311 days.

(21) Appl. No.: 13/797,056

(22) Filed: Mar. 12, 2013

(65) Prior Publication Data

US 2014/0270345 A1    Sep. 18, 2014

(51) Int. Cl.
| G06T 7/00 | (2006.01) |
| G01C 21/26 | (2006.01) |
| G01S 5/16 | (2006.01) |
| G06T 7/20 | (2006.01) |

(52) U.S. Cl.
CPC ............... *G06T 7/004* (2013.01); *G01C 21/26* (2013.01); *G01S 5/16* (2013.01); *G06T 7/0042* (2013.01); *G06T 7/20* (2013.01); *G06T 2207/30244* (2013.01); *G06T 2207/30252* (2013.01)

(58) Field of Classification Search
CPC ........... G06K 9/00791; G06K 9/00825; G06T 7/0022; G06T 7/004; G06T 7/20; G05D 1/0246; G05D 1/0253; G01C 21/3602
See application file for complete search history.

(56) References Cited

U.S. PATENT DOCUMENTS

| 4,933,864 | A | 6/1990 | Evans, Jr. et al. ............. 364/449 |
| 5,155,684 | A * | 10/1992 | Burke et al. ............. 364/424.02 |
| 5,530,330 | A * | 6/1996 | Baiden et al. ................. 318/580 |
| 7,737,393 | B2 | 6/2010 | Fouquet et al. ............... 250/221 |
| 2007/0283264 | A1 | 12/2007 | Vau et al. ...................... 715/700 |
| 2009/0010494 | A1 | 1/2009 | Bechtel et al. ................ 382/104 |
| 2009/0195505 | A1 | 8/2009 | Chen et al. .................... 345/166 |
| 2011/0270518 | A1 | 11/2011 | Nguyen ........................ 701/201 |
| 2012/0027255 | A1 * | 2/2012 | Endo ............................ 382/103 |

FOREIGN PATENT DOCUMENTS

| EP | 2034271 A1 | 3/2009 | ............. G01C 21/00 |
| WO | 2011106578 A2 | 9/2011 | ............. B60W 40/02 |

OTHER PUBLICATIONS

Carlevaris-Bianco N., et al., "EECS 598 Semester Project: Smartphone Localization in Fused Image and Laser Range Data", http://web.eecs.umich.edu/silvio/teaching/EECS598_2010/projects.html, Sep. 1, 2010, pp. 1-10, XP055125694, A Retrieved from the Internet: URL: http://web.eecs.umich.edu/silvio/teaching/EECS598_2010/final_report/Nicholas.pdf [retrieved on Jun. 27, 2014].

(Continued)

*Primary Examiner* — Andrew W Johns
(74) *Attorney, Agent, or Firm* — Hunter Clark PLLC (57) ABSTRACT

A method for estimating movement of a mobile device includes: obtaining images from a camera communicatively coupled to a processor of the mobile device; identifying a stationary light source using at least one image of the images; calculating a displacement of the stationary light source based on a first location of the stationary light source in a first image of the images and a second location of the stationary light source in a second image of the images, the first image and the second image being captured at different times; and estimating movement of the mobile device based on the displacement.

38 Claims, 8 Drawing Sheets

(56) References Cited

OTHER PUBLICATIONS

Fleischer K., et al., "Machine-vision-based detection and tracking of stationary infrastructural objects beside innercity roads", Intelligent Transportation Systems, 2001, Proceedings, 2001 IEEE Aug. 25-29, 2001, Piscataway, NJ, USA, IEEE, Aug. 25, 2001, pp. 525-530, XP010555827, ISBN: 978-0-7803-7194-1.
Partial International Search Report—PCT/US2014/020311—ISA/EPO—Jul. 7, 2014.

Vu A., et al., "Real-Time Computer Vision/DGPS-Aided Inertial Navigation System for Lane-Level Vehicle Navigation", IEEE Transactions on Intelligent Transportation Systems, IEEE, Piscataway, NJ, USA, vol. 13, No. 2, Jun. 1, 2012, pp. 899-913, XP011445715, ISSN: 1524-9050, DOI: 10.1109/TITS.2012.2187641.
International Preliminary Report on Patentability—PCT/US2014/020311, The International Bureau of WIPO—Geneva, Switzerland, Mar. 2, 2015, 13 pgs.
International Search Report & Written Opinion of the International Search Authority (EPO) dated Sep. 2, 2014, for International Application No. PCT/US2014/020311, 22 pgs.

* cited by examiner

METHOD AND APPARATUS FOR MOVEMENT ESTIMATION

BACKGROUND

Mobile device navigation applications can utilize various technologies for determining the position of the associated mobile device over time. These technologies include satellite-based technologies (e.g., GPS, Glonass, etc.), terrestrial-based technologies (e.g., based on base station or access point triangulation, etc.), and/or inertial technologies (e.g., dead reckoning based on accelerometer measurements, etc.). However, if a mobile device is inside an area such as a tunnel or underground facility (e.g., a subway station, an underground parking structure, etc.), these conventional technologies become inaccurate or unusable. For instance, satellite measurements may become unavailable or inaccurate. Measurements based on terrestrial access points may similarly become unavailable unless a sufficient number of access points are deployed within the underground facility. Further, inertial measurements are inherently imprecise and result in accumulated error over time.

SUMMARY

An example method for estimating movement of a mobile device includes: obtaining images from a camera communicatively coupled to a processor of the mobile device; identifying a stationary light source using at least one image of the images; calculating a displacement of the stationary light source based on a first location of the stationary light source in a first image of the images and a second location of the stationary light source in a second image of the images, the first image and the second image being captured at different times; and estimating movement of the mobile device based on the displacement.

Implementations of such a method may include one or more of the following features. Identifying the stationary light source comprises distinguishing the stationary light source from a movable light source. The identifying comprises: identifying a first region in the first image of the images indicative of the stationary light source and a second region in a fourth image of the images indicative of the stationary light source; and analyzing first and second intensities of light associated with the stationary light source in the first and second regions, respectively, to classify the stationary light source. The method further includes classifying the stationary light source as a stationary light source in response to the first and second intensities of light being of magnitudes indicative of the stationary light source being powered by an alternating-current power source. The obtaining comprises capturing the images via a forward-facing, relative to the movement of the mobile device, camera of the mobile device. The obtaining comprises capturing the images via a backward-facing, relative to the movement of the mobile device, camera of the mobile device. The estimating comprises estimating the movement of the mobile device as a function of the displacement and an image capture rate at which the plurality of images is captured. The method further includes determining a position of the mobile device based on an estimated movement of the mobile device. The method further includes evaluating receipt of wireless signals for determining a position of the mobile device, wherein at least one of the capturing, identifying, calculating, or estimating is only performed in response to insufficient wireless signals being received for determining the position of the mobile device. The wireless signals comprise at least one of satellite positioning system signals or cell-based communication system signals. The estimating comprises estimating the movement of the mobile device as a motion vector comprising a speed component and a direction component.

An example apparatus includes: means for obtaining images; means for identifying a stationary light source using at least one of the images; and means for estimating movement including: means for calculating a displacement of the stationary light source based on a first location of the stationary light source in a first image of the images and a second location of the stationary light source in a second image of the images, the first image and the second image being associated with different times; and means for estimating movement of a mobile device based on the displacement.

Implementations of such an apparatus may include one or more of the following features. The means for identifying the stationary light source comprise means for distinguishing the stationary light source from a movable light source. The means for identifying comprise: means for identifying a first region in the first image indicative of the stationary light source and a second region in a fourth image of the images indicative of the stationary light source; and means for analyzing first and second intensities of light associated with the stationary light source in the first and second regions, respectively, to classify the stationary light source. The means for identifying comprise means for classifying the stationary light source as a stationary light source in response to the first and second intensities of light being of magnitudes indicative of the stationary light source being powered by an alternating-current power source. The means for estimating movement of the mobile device comprise means for estimating the movement of the mobile device as a function of the displacement and an image capture rate at which the images are captured. The apparatus further includes means for determining a position of the mobile device based on an estimated movement of the mobile device. The apparatus further includes evaluating means for evaluating receipt of wireless signals for determining a position of the mobile device, wherein at least one of the means for identifying, means for calculating, or means for estimating movement of the mobile device are communicatively coupled to the evaluating means and, to perform a respective function, are responsive to insufficient wireless signals being received for determining the position of the mobile device. The means for estimating movement of the mobile device are for estimating the movement of the mobile device as a motion vector comprising a speed component and a direction component.

An example mobile device includes: a light source module configured to identify a stationary light source using at least one image of multiple images; and a movement module communicatively coupled to the light source module, the movement module being configured to: calculate a displacement of the stationary light source based on a first location of the stationary light source in a first image of the images and a second location of the stationary light source in a second image of the images, the first image and the second image being associated with different times; and estimate movement of the mobile device based on the displacement.

Implementations of such a mobile device may include one or more of the following features. The light source module is configured to: identify a first region in the first image indicative of the stationary light source and a second region in a fourth image of the images indicative of the stationary light source; and analyze first and second intensities of light associated with the stationary light source in the first and second regions, respectively, to classify the stationary light source. The light source module is further configured to classify the stationary light source as a stationary light source in response to the first and second intensities of light being of magnitudes indicative of the stationary light source being powered by an alternating-current power source. The mobile device further includes a camera configured to capture the plurality of images and communicatively coupled to the light source module. The movement module is configured to estimate the movement of the mobile device as a function of the displacement and a difference in time between capture of the first image and capture of the second image. The mobile device further includes a positioning module configured to determine a position of the mobile device based on an estimated movement of the mobile device. The mobile device further includes a positioning module configured to determine a position of the mobile device using wireless signals, where at least one of the light source module or the movement module is communicatively coupled to the positioning module and configured to identify the stationary light source or calculate the displacement or estimate the movement in response to insufficient wireless signals being received for determining the position of the mobile device. The movement module is configured to estimate the movement of the mobile device as a motion vector comprising a speed component and a direction component.

Another example apparatus includes: a memory; and a processor communicatively coupled to the memory and configured to: identify a stationary light source using at least one image of multiple images; calculate a displacement of the stationary light source based on a first location of the stationary light source in a first image of the images and a second location of the stationary light source in a second image of the images, the first image and the second image being associated with different times; and estimate movement of the mobile device based on the displacement Implementations of such an apparatus may include one or more of the following features. The wherein the processor is further configured to: identify a first region in the first image of the images indicative of the stationary light source and a second region in a fourth image of the images indicative of the stationary light source; and analyze first and second intensities of light associated with the stationary light source in the first and second regions, respectively, to classify the stationary light source. The processor is further configured to classify the stationary light source as a stationary light source in response to the first and second intensities of light being of magnitudes indicative of the stationary light source being powered by an alternating-current power source. The processor is configured to estimate the movement of the mobile device as a function of the displacement and a difference in time between capture of the first image and capture of the second image. The processor is further configured to determine a position of the mobile device based on an estimated movement of the mobile device.

An example processor-readable storage medium includes processor-readable instructions configured to cause a processor to: obtain images; identify a stationary light source using at least one image of the images; calculate a displacement of the stationary light source based on a first location of the stationary light source in a first image of the images and a second location of the stationary light source in a second image of the images, the first image and the second image being associated with different times; and estimate movement of a mobile device based on the displacement.

Implementations of such a processor-readable storage medium may include one or more of the following features. The instructions configured to cause the processor to identify the stationary light source comprise instructions configured to cause the processor to: identify a first region in the first image indicative of the stationary light source and a second region in a fourth image of the images indicative of the stationary light source; and analyze first and second intensities of light associated with the stationary light source in the first and second regions, respectively, to classify the stationary light source. The processor-readable storage medium further includes instructions configured to cause the processor to classify the stationary light source as a stationary light source in response to the first and second intensities of light being of magnitudes indicative of the stationary light source being powered by an alternating-current power source. The instructions configured to cause the processor to classify the stationary light source comprise instructions configured to cause the processor to classify the stationary light source as a stationary light source in response to the magnitudes differing by at least a threshold value. The processor-readable storage medium further includes instructions configured to cause the processor to determine a position of the mobile device based on an estimated movement of the mobile device. The instructions configured to cause the processor to estimate the movement of the mobile device comprise instructions configured to cause the processor to estimate the movement of the mobile device as a motion vector comprising a speed component and a direction component.

An example method of classifying a light source as a stationary light source includes: determining that a first region of a first image is indicative of a light source; determining that a second region of a second image corresponds to the first region of the first image, the first image and the second image being associated with different times; determining, by analyzing a characteristic of the first region and the second region, that the light source is driven by alternating-current power; and classifying the light source as a stationary light source in response to determining that the light source is driven by alternating-current power.

Implementations of such a method may include one or more of the following features. The characteristic is pixel intensity and determining that the light source is driven by alternating-current power comprises determining that a difference between a first intensity associated with the first region and a second intensity associated with the second region is indicative of a light source driven by alternating-current power. Determining that the light source is driven by alternating-current power comprises determining that the difference exceeds a threshold value.

Another example apparatus includes: a memory; and a processor communicatively coupled to the memory and configured to: determine that a first region of a first image is indicative of a light source; determine that a second region of a second image corresponds to the first region of the first image, the first image and the second image being associated with different times; determine, by analyzing a characteristic of the first region and the second region, that the light source is driven by alternating-current power; and classify the light source as a stationary light source in response to determining that the light source is driven by alternating-current power.

Another example apparatus includes: means for determining that a first region of a first image is indicative of a light source; means for determining that a second region of a second image corresponds to the first region of the first image, the first image and the second image being associated with different times; means for determining, by analyzing a characteristic of the first region and the second region, that the light source is driven by alternating-current power; and means for classifying the light source as a stationary light source in response to determining that the light source is driven by alternating-current power.

Another processor-readable storage medium includes processor-readable instructions configured to cause a processor to: determine that a first region of a first image is indicative of a light source; determine that a second region of a second image corresponds to the first region of the first image, the first image and the second image being associated with different times; determine, by analyzing a characteristic of the first region and the second region, that the light source is driven by alternating-current power; and classify the light source as a stationary light source in response to determining that the light source is driven by alternating-current power.

Items and/or techniques described herein may provide one or more of the following capabilities, as well as other capabilities not mentioned. Movement of a mobile device may be estimated based on stationary objects such as stationary light sources. A position of a mobile device may be determined in the absence of receipt of sufficient positioning wireless signals in a more accurate manner than using inertial sensor measurement data, or using only such data.

DETAILED DESCRIPTION

Techniques are provided for motion or movement estimation. For example, a vision-based navigation technique may be utilized within tunnels and/or other underground facilities as a standalone positioning system and/or to supplement other positioning techniques associated with a device. Navigation may be based on streetlights that are present in most modern tunnels and underground facilities. As streetlights are static, they can be distinguished with high probability from other light sources. A camera housed within or otherwise communicatively coupled to a mobile device captures image data from within a moving vehicle, from which relative vehicle speed is calculated. Vehicle speed may be calculated by 1) detecting stationary objects (e.g., light sources such as streetlights), 2) neglecting non-stationary objects, and 3) calculating the vehicle speed vector based on changes of stationary object positions in images between images captured at different times. The speed vector can be used by a navigation application and/or other tools to fine-tune the current vehicle position, e.g., in response to insufficient availability of wireless signals for calculating position of the mobile device.

As an example, a device camera is mounted on a dashboard of a vehicle or in any other suitable location at which the camera can be directed toward the movement direction of the vehicle. The camera captures images, e.g., always when on, or in response to a trigger (such as loss of positioning signals such as GPS signals or actuation by a user) of the area in front of the vehicle relative to the direction of movement. An image processor determines displacement of one or light sources using multiple images. Vehicle speed can be calculated based on a known difference in time between captured images. For example, the camera may capture images at a constant capture rate (e.g., 20 frames/second) so that the time between any two image captures is a multiple of the rate, e.g., 0.05 seconds, which can be converted to vehicle speed using displacement information gleaned from the determined displacement information. Image processing can be simplified by processing only light sources that have high contrast compared to the ambient lighting in the surroundings, e.g., within a tunnel that is typically dark. Moreover, in contrast to vehicle headlights or other light sources, streetlights within a tunnel will generally flicker due to being driven by alternating-current (AC) power. This flicker (i.e., variance in observed luminosity), and/or other properties of different light sources, can be used to aid the image processing in isolating desired light sources and disregarding headlights and other undesired light sources from the calculations. Direction of vehicle movement may be determined based on positions of one or more stationary objects in multiple images.

Discussed techniques may be implemented by existing mobile devices without specialized hardware. For example, images may be captured via standard cameras associated with camera-equipped devices, and image processing can be performed without extensions to the processing power of existing mobile devices. Further, using current processors of mobile devices, vehicle speed and changes in direction can be determined.

Figure 1:
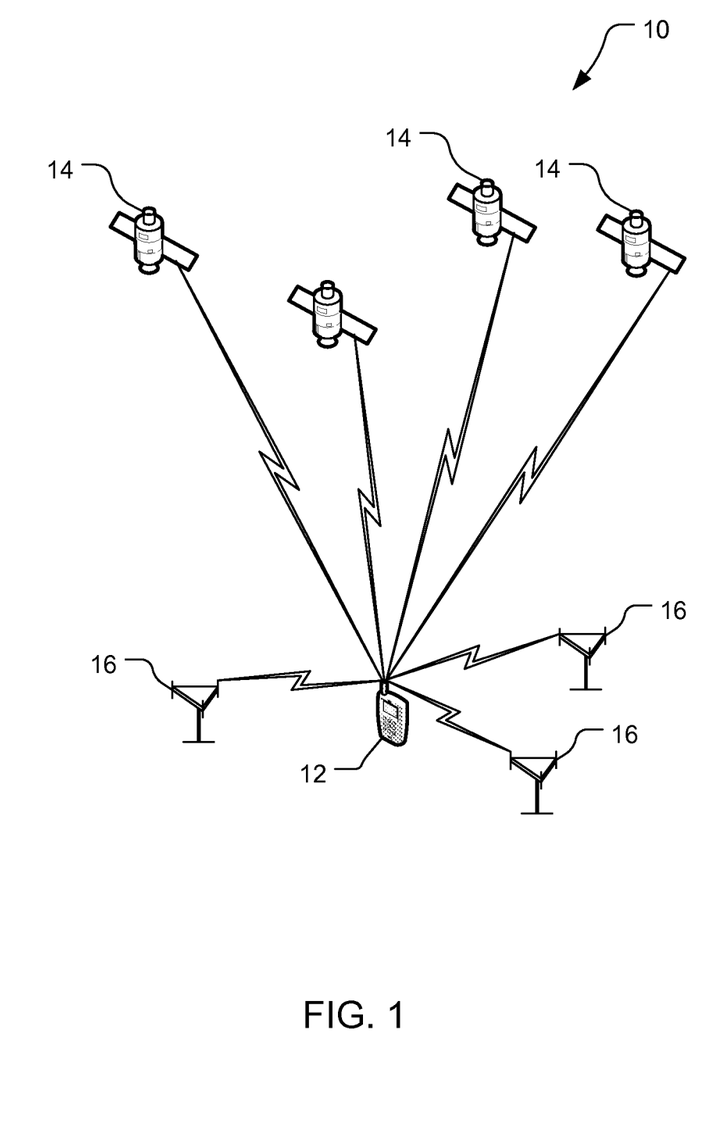
FIG. 1 is a simplified diagram of a mobile device, cellular system base stations, and positioning system satellites.

Referring to FIG. 1, a position location system 10 includes a mobile devices 12, satellites 14, and base transceiver stations (BTSs) 16. The system 10 is configured to determine a position of the mobile device 12. The mobile device 12 is configured to receive and process wireless positioning signals from the satellites 14 (e.g., Global Positioning System (GPS)) satellites or satellites of another satellite positioning system (SPS) such as GLONASS satellites, and/or to receive and process wireless positioning signals from the BTSs 16, to determine a position of the mobile device 12. The BTSs 16 are part of a cell-based communication system and the wireless positioning signals from the BTSs 16 are any signals from the BTSs 16 that can be used for determining position. The mobile device 12 is further configured to determine movement of the mobile device 12 to assist with determining the position of the mobile device in the absence of sufficient available signals from the satellites 14 and/or BTSs 16 to determine the position of the mobile device 12. For example, referring also to FIG. 2, the mobile device 12 may be disposed in a vehicle 20 and the vehicle 20 may move into a region, here a tunnel 22, where insufficient signals from the satellites 14 and/or the BTSs 16 are received by the mobile device 12 to process in order to determine the position of the mobile device 12. That is, not enough signals are available and/or not enough signals of sufficient received strength to process are received that would allow the position of the mobile device 12 to be determined, e.g., at least three BTS signals or at least four satellite signals. While the BTSs 16 are shown as cellular-system nodes, the BTSs 16 could be other forms of nodes and/or for other types of networks such as Wi-Fi nodes, access points, femto-cells, WLAN nodes, WWAN nodes, etc.

Figure 3:
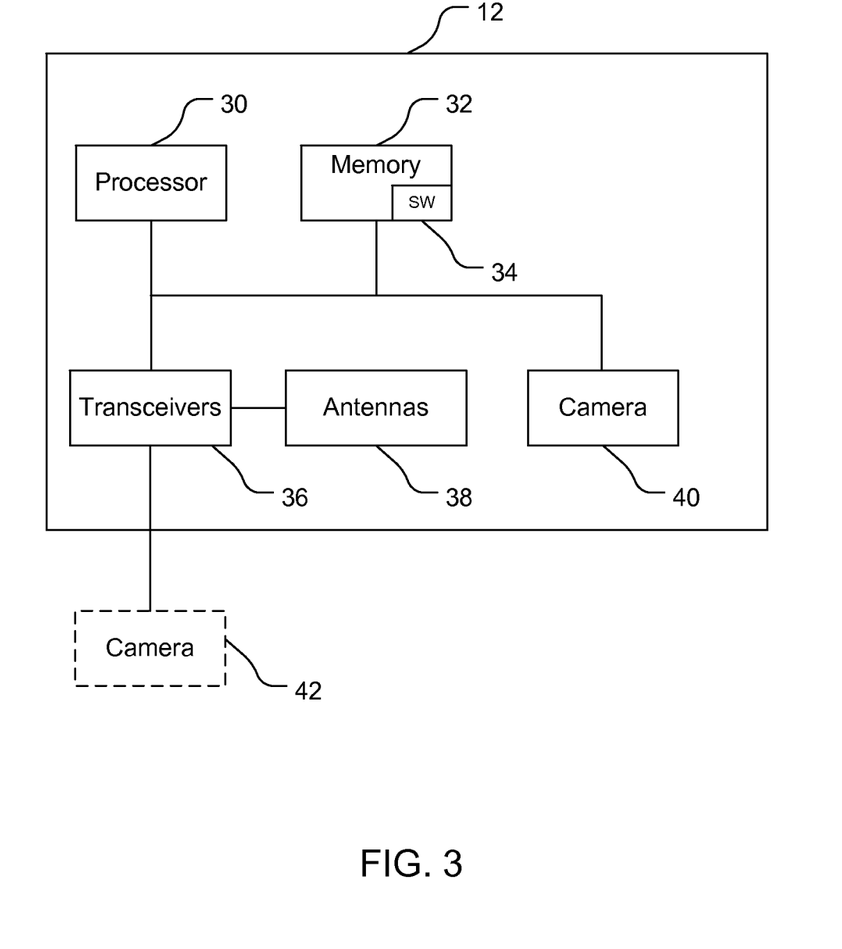
FIG. 3 is a block diagram of components of the mobile device shown in FIG. 2, and an optional external camera.

Referring to FIG. 3, the mobile device 12 comprises a computer system including a processor 30, memory 32 including software 34, transceivers 36, antennas 38, and a camera 40. The processor 30 is preferably an intelligent hardware device, e.g., a central processing unit (CPU) such as those made by ARM®, Intel® Corporation, or AMD®, a microcontroller, an application specific integrated circuit (ASIC), etc. The processor 30 could comprise multiple separate physical entities that can be distributed in the mobile device 12. The memory 32 includes random access memory (RAM) and read-only memory (ROM). The memory 32 is a processor-readable storage medium that stores the software 34. The software 34 is processor-readable, processor-executable software code containing processor-readable instructions that are configured to, when executed, cause the processor 30 to perform various functions described herein. Alternatively, the software 34 may not be directly executable by the processor 30 but is configured to cause the computer, e.g., when compiled and executed, to perform the functions.

The camera 40 is configured to capture images and provide these images to the memory 32 and/or the processor 30. The camera 40 may be a forward-facing camera that is disposed in a back of the mobile device 12 and has a field of view directed away from the back of the mobile device 12. Alternatively, the camera 40 could be a rear-facing camera with a field of view directed away from a front of the mobile device 12, e.g., from the side of a mobile smartphone on which a display screen is disposed. As discussed below, the mobile device 12 can be disposed such that the camera 40 will capture forward-facing images. Forward-facing images are images of a region in front of the mobile device 12 relative to a direction of movement of the mobile device 12, i.e., the camera 40 is pointing in the direction of movement of the mobile device 12. Thus, the camera 40 can be labeled a forward-facing camera if it is pointed in the direction of motion of the mobile device regardless of its position on the mobile device 12.

Also or alternatively, as further shown in FIG. 3, there may be a remote camera 42, i.e., a camera that is external to the mobile device 12 and with which the mobile device 12 is communicatively coupled. The mobile device 12 can communicate with the remote camera 42 through at least one of the transceivers 36 to receive captured images from the camera 42. A dashed-line box is used in FIG. 3 to indicate that the remote camera 42 is optional.

Figure 2:
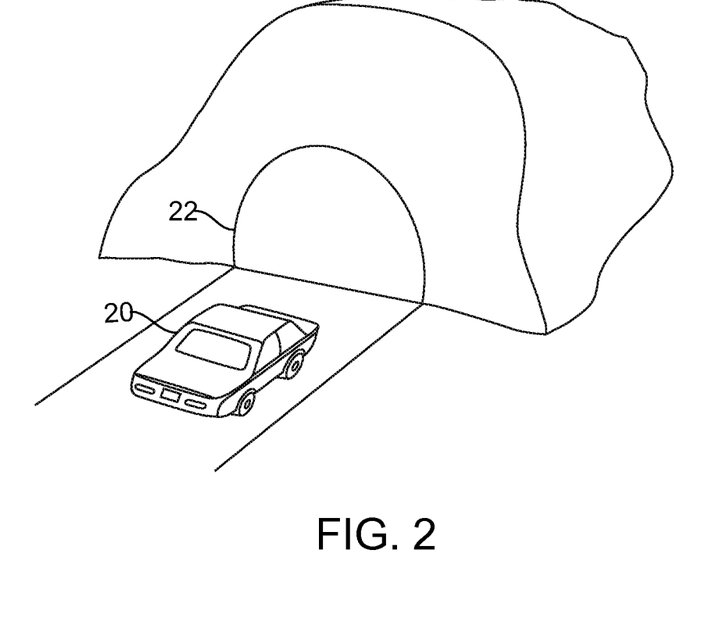
FIG. 2 is a simplified diagram of a vehicle, in which the mobile device shown in FIG. 1 presently resides, entering a tunnel
Figure 4:
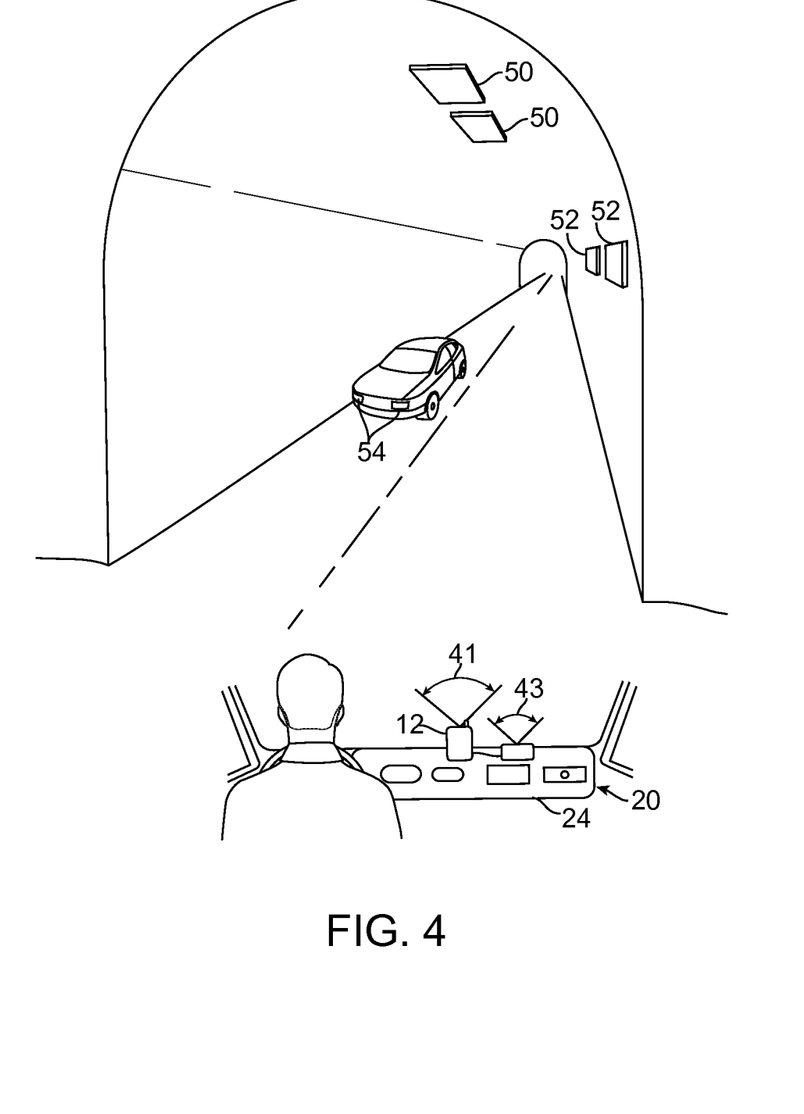
FIG. 4 is a schematic diagram of the mobile device and external camera shown in FIG. 3 disposed in the vehicle in the tunnel shown in FIG. 2.

Referring to FIG. 4, with further reference to FIGS. 2-3, the mobile device 12 may be disposed to have the camera 40, and/or may be coupled to the camera 42 that is disposed to, capture images of stationary objects, in particular stationary light sources. Here, the cameras 40, 42 are disposed to capture images of an area in a direction of motion of the vehicle 20. Either or both of the cameras 40, 42 may not be directed exactly aligned with the direction of motion of the vehicle 20, and could be directed significantly away from the direction of motion. Here, the cameras 40, 42 are mounted on a dashboard 24 of the vehicle 20 to be forward-facing cameras with respective fields of view 41, 43. Alternatively, one or both of the cameras 40, 42 could be disposed to be backward-facing cameras such that the camera(s) 40, 42 would capture images of an area away from which the vehicle is moving, i.e., an area at least partially opposite the direction of motion of the vehicle 20. For example, the camera 40 could be forward facing and the camera 42 backward facing. The cameras 40, 42 are preferably connected to the vehicle 20 to be fixed in relation to the vehicle 20 and thus share the same motion as the vehicle 20, but this is not required (e.g., the mobile device 12 could be held by a user in the vehicle while capturing images). As shown in FIG. 4, the cameras 40, 42 may capture images that include stationary (e.g., fixed to a non-moving object) light sources 50, 52 and a mobile light sources 54. Here, the light sources 50 are ceiling lights and the light sources 52 are wall lights while the mobile light sources 54 are headlights of another vehicle.

Figure 5:
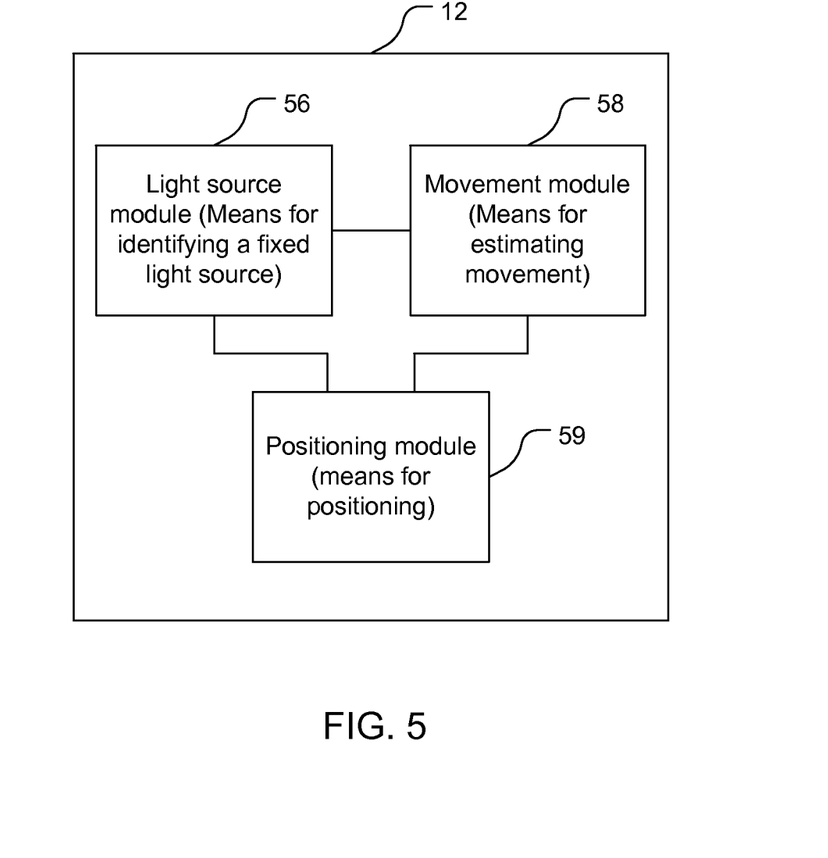
FIG. 5 is a functional block diagram of the mobile device shown in FIG. 1.

Referring to FIG. 5, the mobile device 12 includes a light source module (means for identifying a stationary light source) 56, a movement module (means for estimating movement) 58, and a positioning module (means for positioning/positioning means) 59. The means for estimating movement include means for calculating displacement as discussed below. The modules 56, 58 are functional modules implemented by the processor 30 and the software 34 stored in the memory 32. Thus, reference to either of the modules 56, 58 performing or being configured to perform a function is shorthand for the processor 30 performing or being configured to perform the function in accordance with the software 34 (and/or firmware, and/or hardware of the processor 30). Similarly, reference to the processor 30 performing a function in relation to identifying a stationary light source or estimating movement is equivalent to the light source module 56 or the movement module 58, respectively, performing the function. The light source module 56 is communicatively coupled with the movement module 58 and the positioning module may be communicatively coupled with the light source module 56 and/or may be communicatively coupled with the movement module 58.

The positioning module 59 is configured to determine a position of the mobile device 12 based on signals received by one or more of the antennas 38 and one or more of the transceivers 36. For example, the positioning module 59 may be a satellite positioning system (SPS) module such as a Global Positioning System (GPS) module, configured to use SPS signals to determine the position of the mobile device 12. In this case, the positioning module 59 includes appropriate equipment for monitoring SPS signals from the satellites 14 and determining the position of the mobile device 12. Further, the positioning module 59 could communicate with other entities such as a position determination entity and/or one or more of the BTSs 16 in order to send and/or receive assistance information for use in determining the location of the mobile device 12. Also or alternatively, the positioning module 59 may be configured to use signals from one or more of the BTSs 16 to determine the position, e.g., triangulate the position, of the mobile device 12.

The light source module 56 is configured to identify stationary light sources. The light source module 56 is configured to analyze captured images from one or more of the cameras 40, 42, to discern light sources in the images, and to determine regions that are likely to be of light sources, and then of those, which light sources are likely to be stationary light sources and which light sources are likely to be mobile light sources. The regions may be referred to as light sources as shorthand for regions of images corresponding to light sources.

Figure 6A:
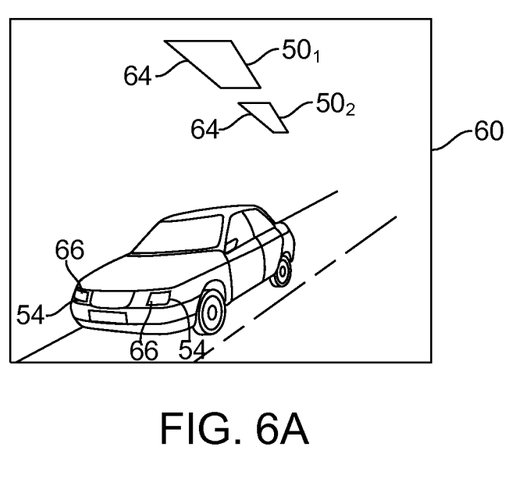
FIGS. 6A-6B are images captured by an internal camera shown in FIG. 4.
Figure 6B:
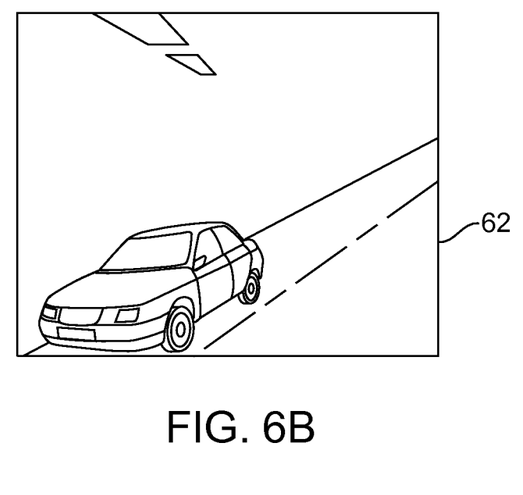

For example, referring also to FIGS. 6A-6B, the light source module 56 can analyze images 60, 62 provided by the camera 40 to determine regions of the images 60, 62 that are likely to be light sources. For this example, it is assumed that the images 60, 62 are captured by the camera 40, although one or more images from the camera 42 could be used alone or in combination with one or more images from the camera 40 (if images from different cameras are used, some compensation for different perspectives may be applied). In this example, the image 60 is captured before the image 62 is captured. The light source module 56 is configured to analyze the images 60, 62 to find regions of pixel intensity (and possibly color) that are likely to correspond to light sources, e.g., pixel intensity (at or) above a threshold intensity. The regions may be identified as light sources if the pixel intensity satisfies the threshold intensity in at least one image. In this example, the light source module 56 finds that regions 64$_1$, 64$_2$, 66 of the image 60 corresponding to the light sources 50$_1$, 50$_2$, and 54, respectively, have pixel intensities indicative of light sources, and thus identifies these regions 64$_1$, 64$_2$, 66 as being light sources. The light source module 56 also notes pixels adjacent to the regions 64$_1$, 64$_2$, 66 corresponding to the light sources 50, 54.

The light source module 56 is configured to analyze the intensities of regions determined to be of light sources in multiple images, here the images 60, 62, to determine which light sources are likely to be mobile light sources and which light sources are likely to be stationary light sources. The light source module 56 can determine regions in the image 62 that correspond to regions in the image 60 of light sources. For example, the light source module 56 can determine that regions 68$_1$, 68$_2$ correspond to the regions 64$_1$, 64$_2$, e.g., using shapes of the regions 64, 68 and/or using pixels adjacent to the regions 64 to disambiguate light sources (e.g., to identify uniquely the light sources 50$_1$, 50$_2$), etc. The light source module 56 can classify (i.e., includes means for classifying) each of the light sources, e.g., as a stationary light source or a mobile (i.e., movable) light source (or at least that it is unreliable that the light source is a stationary light source, i.e., that it is not likely to be stationary), distinguishing between a mobile light source and a stationary light source. The light source module 56 analyzes the regions 64, 66 of the images 60, 62 corresponding to light sources to determine whether the intensities, i.e., the magnitudes of the intensities, of the light from the light sources varies in such a way as to indicate that the light source is powered by an alternating-current (AC) power source. Lights on vehicles are typically driven by direct-current (DC) power sources and thus their intensities will be stable while stationary light sources are typically driven by AC power sources and their intensities will vary significantly, even strobing or alternating between an ON state and an OFF state. In this example, the light source module 56 finds the regions 66 in the image 62 corresponding to the light sources 54 have intensities indicative of light sources. The light source module 56 identifies the regions 64, 66 as corresponding to light sources if the intensities in the regions 64, 66 are strong (e.g., indicative of a light source), or uses pixels adjacent to the light sources 50$_1$, 50$_2$ to locate the regions 64, 66 of the image 62 corresponding to the light sources 50$_1$, 50$_2$ if the intensities are weak. The light source module 56 can reanalyze a previously analyzed image for a light source (e.g., that may have had a weak intensity in the previously analyzed image) if a new light source is found in a later-analyzed image. In this example, the light source module 56 finds that the intensities of the light sources 50$_1$, 50$_2$, while indicative of light sources, differ from the intensities of the light sources 50$_1$, 50$_2$ in the image 60 enough to indicate that the light sources 50$_1$, 50$_2$ are likely driven by an AC power source. For example, the light source module 56 could determine that a variance in the pixel intensities of the light sources 50$_1$, 50$_2$ between the images 60, 62 is (at or) above a threshold intensity variance, and/or (at or) above a threshold intensity percentage variance. The light source module 56 thus classifies and identifies the light sources 50$_1$, 50$_2$ as stationary light sources. While in this example, the intensities of the light sources 50$_1$, 50$_2$ was higher in the earlier captured image, the light source module 56 can identify light sources and determine stationary light sources where the intensity is lower in the earlier captured image. Further, the light source module 56 can distinguish between stationary and mobile light sources. For example, the light source module 56 can determine that the light sources 54 are of stable intensities in the images 60, 62 (e.g., their intensities are within a stable intensity threshold) and therefore likely to be driven by a DC power source and therefore likely not to be a stationary light source. The intensities of the light sources, here the light sources 50, 54, may be any of a variety of intensities, e.g., minimum pixel intensity within the region of the light source in an image, maximum pixel intensity within the region of the light source in an image, average intensity of all (or a selected portion less than all) of the pixels within the region of the light source in an image, etc.

The movement module 58 is configured to estimate movement of the mobile device 12, e.g., based on displacement of stationary light sources between captured images. The movement module 58 uses information from the light source module 56 to estimate movement of the mobile device 12. The movement module 58 analyzes the regions, e.g., the regions 64, of the images 60, 62 identified (and indicated) by the light source module 56 to be a stationary light source. The discussion below will assume only one stationary light source, but movement module 58 can analyze multiple stationary light sources. The movement module 58 determines displacement of the stationary light source between the two images 60, 62 based on known characteristics of the camera 40 (again, assuming the camera 40 alone captures the images 60, 62) and using known techniques to process the information to determine the displacement. For example, the movement module 58 uses the field of view of the camera 40, and changes in orientation of the camera 40 to calculate the displacement. The movement module 59 can use the magnitude and direction of displacement of the stationary light source between the images 60, 62 to estimate the magnitude and direction of the movement of the mobile device 12 (e.g., taking the calculated displacement as the estimated movement). Further, the movement module 58 can use the relative timing of capture of the images 60, 62 (e.g., a known periodic image capture rate of the camera 40 and the number of images, if any, between the analyzed images 60, 62 (i.e., whether the images 60, 62 are consecutively captured images or were separated in time by one or more other captured images)) and the displacement to determine a speed of the mobile device 12. The movement module 58 can combine calculation results to determine one or more movement vectors, e.g., of displacement and direction and/or of speed and direction. If the positioning module 59 is communicatively coupled to the movement module 58, then the positioning module 59 can use the estimated movement of the mobile device 12 to estimate a position of the mobile device 12 based on a previously-determined position, e.g., using satellite signals and/or BTS signals. The movement module 58 preferably only operates on information of light sources identified by the light source module 56 as being stationary.

Capturing of the images 60, 62 and/or identification of stationary light sources by the light source module 56 and/or estimation of movement, by the movement module 58, of the mobile device 12 may be triggered in response to loss of sufficient information by the positioning module 59 to determine the position of the mobile device 12. The positioning module 59 may monitor received signals for a loss of signal power from the satellites 14 and/or the BTSs 16, e.g., not enough signals received of sufficient power for processing in order to determine the position of the mobile device 12 with desired accuracy (e.g., less than four satellite signals or less than three BTS signals). The positioning module 59 may respond to this signal power loss by triggering the camera 40 to capture images and/or the light source module 56 to process captured images and/or the movement module 58 to estimate movement of the mobile device 12. The light source module 56 and/or the movement module 58 may be configured to operate only in response to receiving a trigger from the positioning module 59, or may operate to provide supplemental information to the positioning module to confirm or improve estimated position of the mobile device 12.

Figure 7:
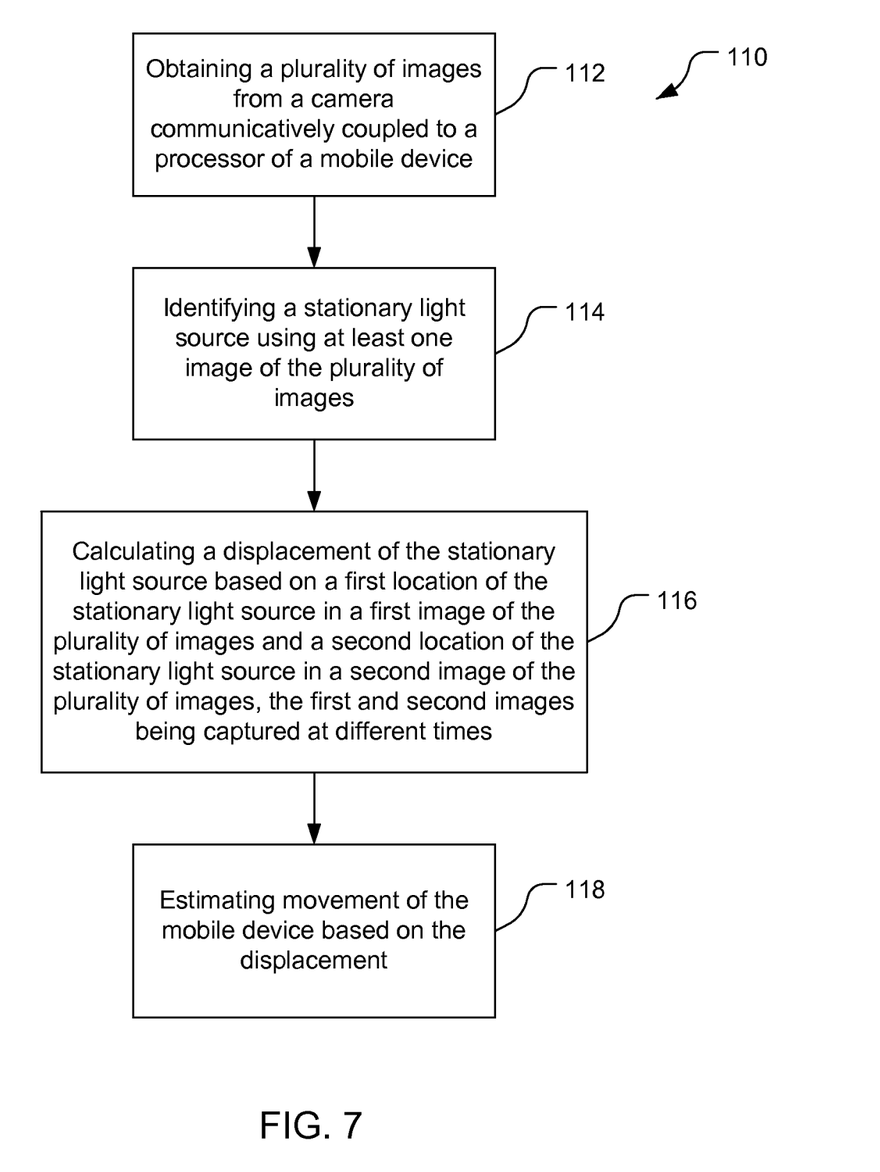
FIG. 7 is a block flow diagram of a process of estimating movement of the mobile device shown in FIG. 1.

Referring to FIG. 7, with further reference to FIGS. 1-6, a process 110 of estimating movement of the mobile device 12 includes the stages shown. The process 110 is, however, an example only and not limiting. The process 110 can be altered, e.g., by having stages added, removed, rearranged, combined, and/or performed concurrently. Further, while the discussion below focuses on estimating movement of the mobile device 12 while in an area of insufficient availability of wireless signals (e.g., SPS signals and/or cell-based communication system signals) for calculating position of the mobile device 12 (specifically, in a tunnel), the process 110 can be used in other environments including other environments of insufficient availability of wireless signals for calculating position of the mobile device 12 and/or environments of sufficient availability of wireless signals for calculating position of the mobile device 12. The process 110 may include evaluating (by evaluating means implemented by the processor 30 and the software 34) receipt of (or lack thereof) wireless signals for determining a position of the mobile device 12. At least one of the stages 112, 114, 116, 118 discussed below may be performed only in response to insufficient availability of wireless signals for calculating position of the mobile device 12. Also, the description below discusses identifying and using "a" light source for simplicity, but the process 110 may be used for identifying and using more than one light source.

At stage 112, the process 110 includes obtaining a plurality of images from a camera communicatively coupled to a processor of the mobile device. The obtaining may comprise capturing one or more images using the camera 40 and/or the camera 42 and/or receiving one or more images captured by the camera 40 and/or the camera 42. The camera 40 and/or the camera 42 captures images and provide these images to the processor 30. For example, the camera 40 captures the images 60, 62.

At stage 114, the process 110 includes identifying a stationary light source using at least a first image of the plurality of images. The light source module 56 analyzes at least one of the images to locate a region in the image(s) likely to be a light source. Continuing the example, the light source module 56 determines that a region corresponding to the light source $50_2$ is likely to be a light source. Further, the light source module 56 can assume that the light source is stationary, or can determine that the light source $50_2$ is likely to be a stationary light source, here by analyzing differences in intensities of the regions of the images 60, 62 corresponding to the light source $50_2$. The light source module 56 classifies (identifies) the light source $50_2$ as a stationary light source in response to determining that the intensity of the light source $50_2$ varies sufficiently to indicate that the light source $50_2$ is driven by AC power.

At stage 116, the process 110 includes calculating a displacement of the stationary light source based on a first location of the stationary light source in a first image of the plurality of images and a second location of the stationary light source in a second image of the plurality of images, the first and second images being captured at different times. The movement module 58 analyzes the regions of different images corresponding to the same stationary light source and orientation-change information (e.g., from accelerometers or other sensors of the mobile device 12) to determine the displacement, distance and/or direction, of the stationary light source.

At stage 118, the process 110 includes estimating movement of the mobile device based on the displacement. The movement module 58 uses the calculated movement as an estimate of the movement of the mobile device 12. The movement module 58 uses this information and information as to the time of capture of the images 60, 62 (at least their time separation between capture) to determine the speed of the mobile device 12. The movement module 58 provides one or more vectors indicative of the movement, e.g., a motion vector of displacement and direction (i.e., with a displacement component and a direction component) and/or a motion vector of speed and direction (i.e., with a speed component and a direction component). Also or alternatively, the movement module 58 combines the calculated displacement and/or speed and/or direction to determine a position of the mobile device 12. To do this, the movement module 58 obtains information of a previous position (e.g., provided by the positioning module 59) of the mobile device 12 and adjusts that position based on the calculated displacement from a time associated with the previous position.

Figure 8:
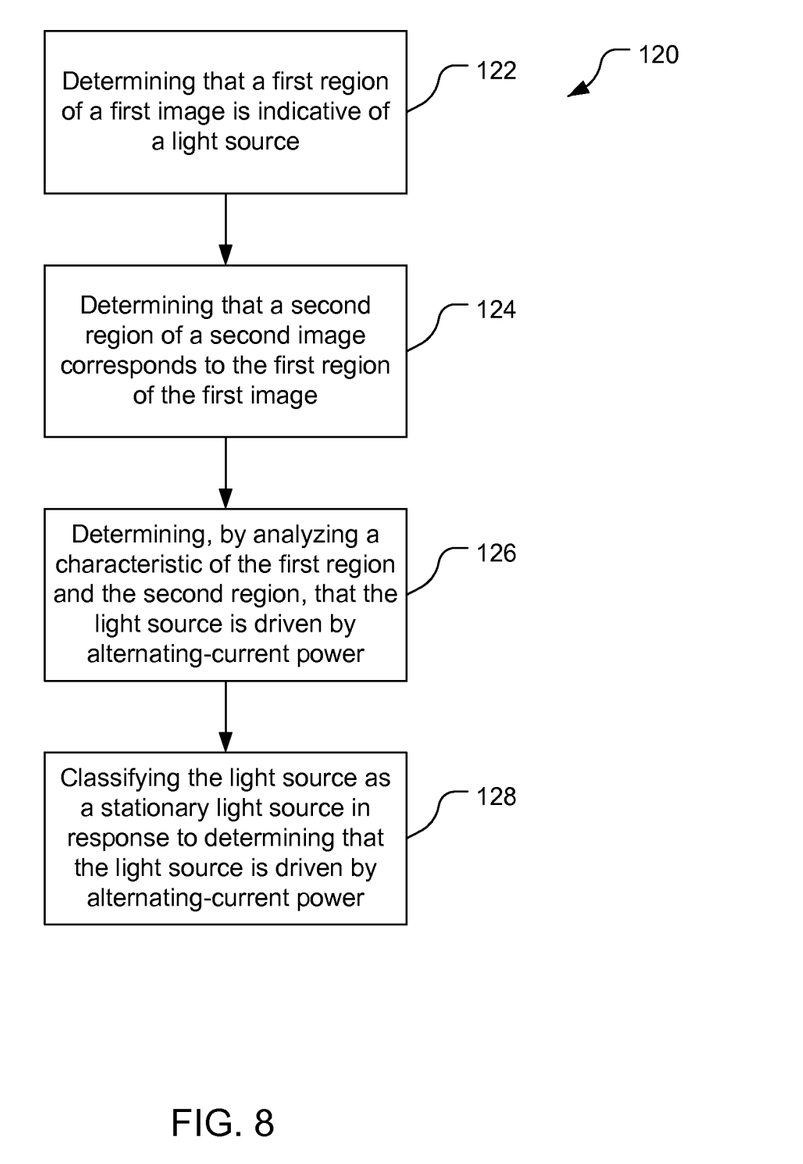
FIG. 8 is a block flow diagram of a process of classifying a light source as a stationary light source.

Referring to FIG. 8, with further reference to FIGS. 1-6, a process 120 of classifying a light source as a stationary light source includes the stages shown. The process 120 is, however, an example only and not limiting. The process 120 can be altered, e.g., by having stages added, removed, rearranged, combined, and/or performed concurrently. Also, the description below discusses identifying and using "a" light source for simplicity, but the process 120 may be used for classifying more than one light source. The description below uses an example of the images 60, 62 for the regions $64_2, 68_2$, but this is only an example, and not limiting of the process 120.

At stage 122, the process 120 includes determining that a first region of a first image is indicative of a light source. The light source module 56 analyzes an image, e.g., the image 60, and identifies a region, e.g., the region $64_2$, of high intensity pixels and determines that this region is indicative of a light source.

At stage 124, the process 120 includes determining that a second region of a second image corresponds to the first region of the first image, the first image and the second image being associated with different times. The first image 60 and the second image 62 are captured, e.g., by the camera 40, at different times, in this example the image 60 is captured before the image 62. The light source module 56 determines that the region $68_2$ in the image 62 corresponds to the region $64_2$ in the image 60, e.g., by analyzing pixels adjacent to the region $64_2$ in the image 60 and identifying those adjacent pixels in the image 62. Also or alternatively, the light source module 56 may determine that the regions $64_2, 68_2$ in the two images 60, 62 correspond because the shape of the region $64_2$ is the same as the shape of the region $68_2$, and/or by using other techniques.

At stage 126, the process 120 includes determining, by analyzing a characteristic of the first region $64_2$ and the second region $68_2$, that the light source is driven by alternating-current power. In this example, the light source module 56 analyzes an intensity (e.g., average intensity, median intensity, peak intensity, etc.) of the first region $64_2$ and an intensity of the second region $68_2$ to determine that the light source is driven by AC power. For example, the light source module can determine that the light source is driven by AC power in response to a difference between the intensities of the regions $64_2, 68_2$ exceeding a threshold value.

At stage 128, the process 120 includes classifying the light source as a stationary light source in response to determining that the light source is driven by alternating-current power. The light source module 56 classifies the light source as a stationary light source if the difference in intensities exceeds the threshold value (the magnitudes of the intensities differing by at least the threshold). That is, the light source module 56 classifies the regions $64_2$, $68_2$ as corresponding to a stationary light source in response to these regions likely depicting a light source that is driven by AC power and thus that is likely to have a fixed location as the light source is likely receiving power from a grid and not a portable power source such as a battery.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C), or combinations with more than one feature (e.g., AA, AAB, ABBC, etc.).

As used herein, including in the claims, unless otherwise stated, a statement that a function or operation is "based on" an item or condition means that the function or operation is based on the stated item or condition and may be based on one or more items and/or conditions in addition to the stated item or condition.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a computing system.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

The terms "machine-readable medium" and "computer-readable medium," as used herein, refer to any medium that participates in providing data that causes a machine to operate in a specific fashion. Using a computer system, various computer-readable media might be involved in providing instructions/code to processor(s) for execution and/or might be used to store and/or carry such instructions/code (e.g., as signals). In many implementations, a computer-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to one or more processors for execution. Merely by way of example, the instructions may initially be carried on a magnetic disk and/or optical disc of a remote computer. A remote computer might load the instructions into its dynamic memory and send the instructions as signals over a transmission medium to be received and/or executed by a computer system.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional stages or functions not included in the figure. Furthermore, examples of the methods may be implemented by hardware, software, firmware, middleware, microcode, hardware description languages, or any combination thereof. When implemented in software, firmware, middleware, or microcode, the program code or code segments to perform the tasks may be stored in a non-transitory computer-readable medium such as a storage medium. Processors may perform the described tasks.

Components, functional or otherwise, shown in the figures and/or discussed herein as being connected or communicating with each other are communicatively coupled. That is, they may be directly or indirectly connected to enable communication between them.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A wireless communication network does not have all communications transmitted wirelessly, but is configured to have at least some communications transmitted wirelessly.

Further, more than one invention may be disclosed.

The invention claimed is:

1. A method for estimating movement of a mobile device, the method comprising:
 obtaining a plurality of images from a camera communicatively coupled to a processor of the mobile device;
 identifying a stationary light source using at least one image of the plurality of images;
 calculating a displacement of the stationary light source based on a first location of the stationary light source in a first image of the plurality of images and a second location of the stationary light source in a second image of the plurality of images, the first image and the second image being captured at different times; and
 estimating movement of the mobile device based on the displacement.

2. The method of claim 1 wherein identifying the stationary light source comprises distinguishing the stationary light source from a movable light source.

3. The method of claim 1 wherein the identifying comprises:
 identifying a first region in the first image of the plurality of images indicative of the stationary light source and a second region in a fourth image of the plurality of images indicative of the stationary light source; and
 analyzing first and second intensities of light associated with the stationary light source in the first and second regions, respectively, to classify the stationary light source.

4. The method of claim 3 further comprising classifying the stationary light source as a stationary light source in response to the first and second intensities of light being of magnitudes indicative of the stationary light source being powered by an alternating-current power source.

5. The method of claim 1 wherein the obtaining comprises capturing the plurality of images via a forward-facing, relative to the movement of the mobile device, camera of the mobile device.

6. The method of claim 1 wherein the obtaining comprises capturing the plurality of images via a backward-facing, relative to the movement of the mobile device, camera of the mobile device.

7. The method of claim 1 wherein the estimating comprises estimating the movement of the mobile device as a function of the displacement and an image capture rate at which the plurality of images is captured.

8. The method of claim 1 further comprising determining a position of the mobile device based on an estimated movement of the mobile device.

9. The method of claim 1 further comprising evaluating receipt of wireless signals for determining a position of the mobile device, wherein at least one of the capturing, identifying, calculating, or estimating is only performed in response to insufficient wireless signals being received for determining the position of the mobile device.

10. The method of claim 9 wherein the wireless signals comprise at least one of satellite positioning system signals or cell-based communication system signals.

11. The method of claim 1 wherein the estimating comprises estimating the movement of the mobile device as a motion vector comprising a speed component and a direction component.

12. An apparatus comprising:
 means for obtaining a plurality of images;
 means for identifying a stationary light source using at least one image of the plurality of images; and
 means for estimating movement including:
  means for calculating a displacement of the stationary light source based on a first location of the stationary light source in a first image of the plurality of images and a second location of the stationary light source in a second image of the plurality of images, the first image and the second image being associated with different times; and
  means for estimating movement of a mobile device based on the displacement.

13. The apparatus of claim 12 wherein the means for identifying the stationary light source comprise means for distinguishing the stationary light source from a movable light source.

14. The apparatus of claim 12 wherein the means for identifying comprise:
 means for identifying a first region in the first image of the plurality of images indicative of the stationary light source and a second region in a fourth image of the plurality of images indicative of the stationary light source; and
 means for analyzing first and second intensities of light associated with the stationary light source in the first and second regions, respectively, to classify the stationary light source.

15. The apparatus of claim 14 wherein the means for identifying comprise means for classifying the stationary light source as a stationary light source in response to the first and second intensities of light being of magnitudes indicative of the stationary light source being powered by an alternating-current power source.

16. The apparatus of claim 12 wherein the means for estimating movement of the mobile device comprise means for estimating the movement of the mobile device as a function of the displacement and an image capture rate at which the plurality of images is captured.

17. The apparatus of claim 12 further comprising means for determining a position of the mobile device based on an estimated movement of the mobile device.

18. The apparatus of claim 12 further comprising evaluating means for evaluating receipt of wireless signals for determining a position of the mobile device, wherein at least one of the means for identifying, means for calculating, or means for estimating movement of the mobile device are communicatively coupled to the evaluating means and, to perform a respective function, are responsive to insufficient wireless signals being received for determining the position of the mobile device.

19. The apparatus of claim 12 wherein the means for estimating movement of the mobile device are for estimating the movement of the mobile device as a motion vector comprising a speed component and a direction component.

20. A mobile device comprising:
 a memory storing instructions; and
 a processor communicatively coupled to the memory and configured to execute the instructions to:
  identify a stationary light source using at least one image of a plurality of images;
  calculate a displacement of the stationary light source based on a first location of the stationary light source in a first image of the plurality of images and a second location of the stationary light source in a second image of the plurality of images, the first image and the second image being associated with different times; and estimate movement of the mobile device based on the displacement.

21. The mobile device of claim 20 wherein the processor is further configured to execute the instructions to:

identify a first region in the first image of the plurality of images indicative of the stationary light source and a second region in a fourth image of the plurality of images indicative of the stationary light source; and analyze first and second intensities of light associated with the stationary light source in the first and second regions, respectively, to classify the stationary light source.

22. The mobile device of claim 21 wherein the processor is further configured to execute the instructions to classify the stationary light source as a stationary light source in response to the first and second intensities of light being of magnitudes indicative of the stationary light source being powered by an alternating-current power source.

23. The mobile device of claim 20 further comprising a camera configured to capture the plurality of images and communicatively coupled to the processor.

24. The mobile device of claim 20 wherein the processor is further configured to execute the instructions to estimate the movement of the mobile device as a function of the displacement and a difference in time between capture of the first image and capture of the second image.

25. The mobile device of claim 20 wherein the processor is further configured to execute the instructions to determine a position of the mobile device based on an estimated movement of the mobile device.

26. The mobile device of claim 20 wherein the processor is further configured to execute the instructions to determine a position of the mobile device using wireless signals, and to identify the stationary light source or calculate the displacement or estimate the movement in response to insufficient wireless signals being received for determining the position of the mobile device.

27. The mobile device of claim 20 wherein the processor is further configured to estimate the movement of the mobile device as a motion vector comprising a speed component and a direction component.

28. An apparatus comprising:

a memory; and a processor communicatively coupled to the memory and configured to:

identify a stationary light source using at least one image of a plurality of images;

calculate a displacement of the stationary light source based on a first location of the stationary light source in a first image of the plurality of images and a second location of the stationary light source in a second image of the plurality of images, the first image and the second image being associated with different times; and estimate movement of the apparatus based on the displacement.

29. The apparatus of claim 28 wherein the processor is further configured to:

identify a first region in the first image of the plurality of images indicative of the stationary light source and a second region in a fourth image of the plurality of images indicative of the stationary light source; and analyze first and second intensities of light associated with the stationary light source in the first and second regions, respectively, to classify the stationary light source.

30. The apparatus of claim 29 wherein the processor is further configured to classify the stationary light source as a stationary light source in response to the first and second intensities of light being of magnitudes indicative of the stationary light source being powered by an alternating-current power source.

31. The apparatus of claim 28 wherein the processor is configured to estimate the movement of the apparatus as a function of the displacement and a difference in time between capture of the first image and capture of the second image.

32. The apparatus of claim 28 wherein the processor is further configured to determine a position of the apparatus based on an estimated movement of the apparatus.

33. A non-transitory processor-readable storage medium comprising processor-readable instructions configured to cause a processor to:

obtain a plurality of images;

identify a stationary light source using at least one image of the plurality of images;

calculate a displacement of the stationary light source based on a first location of the stationary light source in a first image of the plurality of images and a second location of the stationary light source in a second image of the plurality of images, the first image and the second image being associated with different times; and estimate movement of a mobile device based on the displacement.

34. The non-transitory processor-readable storage medium of claim 33 wherein the instructions configured to cause the processor to identify the stationary light source comprise instructions configured to cause the processor to:

identify a first region in the first image of the plurality of images indicative of the stationary light source and a second region in a fourth image of the plurality of images indicative of the stationary light source; and analyze first and second intensities of light associated with the stationary light source in the first and second regions, respectively, to classify the stationary light source.

35. The non-transitory processor-readable storage medium of claim 34 further comprising instructions configured to cause the processor to classify the stationary light source as a stationary light source in response to the first and second intensities of light being of magnitudes indicative of the stationary light source being powered by an alternating-current power source.

36. The non-transitory processor-readable storage medium of claim 35 wherein the instructions configured to cause the processor to classify the stationary light source comprise instructions configured to cause the processor to classify the stationary light source as a stationary light source in response to the magnitudes differing by at least a threshold value.

37. The non-transitory processor-readable storage medium of claim 33 further comprising instructions configured to cause the processor to determine a position of the mobile device based on the estimated movement of the mobile device.

38. The non-transitory processor-readable storage medium of claim 33 wherein the instructions configured to cause the processor to estimate the movement of the mobile device comprise instructions configured to cause the processor to estimate the movement of the mobile device as a motion vector comprising a speed component and a direction component.

* * * * *